United States Patent
Nusbickel et al.

(10) Patent No.: US 7,085,851 B2
(45) Date of Patent: Aug. 1, 2006

(54) SNMP INTERFACE TO EXISTING RESOURCE MANAGEMENT EXTENSION-ENABLED MANAGEMENT AGENTS

(75) Inventors: Wendi L. Nusbickel, Boca Raton, FL (US); William V. Da Palma, Coconut Creek, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 10/189,722

(22) Filed: Jul. 3, 2002

(65) Prior Publication Data

US 2004/0024579 A1 Feb. 5, 2004

(51) Int. Cl.
*G06F 13/00* (2006.01)

(52) U.S. Cl. .............. 709/246; 709/250; 719/313; 707/104

(58) Field of Classification Search ............. 709/219, 709/230, 246, 250; 719/313, 316; 707/100, 707/104
See application file for complete search history.

(56) References Cited

U.S. PATENT DOCUMENTS

| | | | |
|---|---|---|---|
| 5,960,176 A | 9/1999 | Kuroki et al. ......... 395/200.53 |
| 5,996,010 A | 11/1999 | Leong et al. ............... 709/223 |
| 6,009,431 A * | 12/1999 | Anger et al. ................. 707/10 |
| 6,032,183 A | 2/2000 | Chen et al. ................. 709/223 |
| 6,061,721 A | 5/2000 | Ismael et al. ............... 709/223 |
| 6,073,162 A | 6/2000 | Johannsen et al. .......... 709/202 |
| 6,167,448 A | 12/2000 | Hemphill et al. ........... 709/224 |
| 6,212,560 B1 | 4/2001 | Fairchild .................... 709/223 |
| 6,219,708 B1 | 4/2001 | Martenson .................. 709/226 |
| 6,253,243 B1 * | 6/2001 | Spencer ...................... 709/224 |
| 6,260,062 B1 | 7/2001 | Davis et al. ................. 709/223 |
| 6,272,537 B1 | 8/2001 | Kekic et al. ................. 709/223 |
| 6,282,568 B1 | 8/2001 | Sondur et al. .............. 709/223 |
| 6,308,206 B1 | 10/2001 | Singh ........................ 709/223 |
| 2002/0091809 A1 * | 7/2002 | Menzies et al. ............ 709/223 |
| 2003/0028895 A1 * | 2/2003 | Buehler et al. ............. 725/119 |
| 2003/0074436 A1 * | 4/2003 | Gieseke ...................... 709/223 |

FOREIGN PATENT DOCUMENTS

| | | |
|---|---|---|
| JP | 11-224196 | 8/1999 |
| JP | 11-232239 | 8/1999 |
| JP | 11-234276 | 8/1999 |

OTHER PUBLICATIONS

U.S. Appl. No. 09/649,121, filed Aug. 28, 2000, Da Palma et al.

(Continued)

*Primary Examiner*—Viet D. Vu
(74) *Attorney, Agent, or Firm*—Akerman Senterfitt

(57) ABSTRACT

A method of adding a simple network management protocol (SNMP) interface to an existing resource management extension-enabled management agent without modifying the management agent can include reading a management information base definition of the management agent and creating a static mapping of SNMP object identifiers to management software components of the management agent using the management information base definition. During operation of the management agent, dynamic operating information for the management software components of the management agent can be determined. The static mapping can be updated with the dynamic operating information.

24 Claims, 4 Drawing Sheets

OTHER PUBLICATIONS

*Koshna SNMP JMX Toolkit: Creating the JMX to SNMP Map File*, <http://www.koshna.com/products/KSX/docs/jmx2snm_map.asp>, (2002).

*Multidomain Network Management Using Common Object Request Broker Architecture, IBM Technical Disclosure Bulletin*, vol. 40, No. 06, (Jun. 1997).

H. Kreger, *Java Management Extensions for Application Management, IBM Systems Journal*, vol. 40, No. 1, (2001).

J. Vayssiere, *Transparent Dissemination of Adapters in Jini, Proc. 3rd Int'l. Symposium on Distributed Objects and Applications*, pp. 95-104, (2001).

J. Lee, *TMN-Based Q-Adaptation Using Java Technology, Seamless Interconnection for Universal Services, Global Telecommunications Conference GLOBECOM '99*, vol. 1b, pp. 802-806, (1999).

\* cited by examiner

SNMP INTERFACE TO EXISTING RESOURCE MANAGEMENT EXTENSION-ENABLED MANAGEMENT AGENTS

BACKGROUND OF THE INVENTION

1. Technical Field

This invention relates to the field of resource management, and more particularly, to interfacing network management systems with management agents.

2. Description of the Related Art

Management agents serve as an interface providing a layer of isolation between management systems and managed resources such as business applications, devices, or software implementations of services or policies. Management agents can be implemented using resource management extensions to programming languages. Accordingly, to manage resources via a particular resource management extension architecture, the resource must be enabled in accordance with the specification of the management agent with which the resource is to communicate.

Although resource management extensions exist for various programming languages, one example of a resource management extension architecture is the Java Management Extension (JMX) architecture. JMX®, defined in the JMX specification, defines an architecture, design patterns, application programming interfaces (APIs), and services for application and network management using the Java programming language. The JMX specification is a well-known set of specifications and development tools for managing Java environments and building management solutions. The JMX specification, which is incorporated herein by reference, has been defined in the document *Java Management Extensions Instrumentation and Agent Specification*, v1.1 (March 2002), published by Sun Microsystems, Inc. of Palo Alto, Calif.

Although resource management extension architectures continue to gain favor as industry standards, a limited number of such architectures are in operation. Many legacy systems, for example Unix-based products, rely upon Simple Network Management Protocol (SNMP). Presently, no standardized solution exists to provide interoperability between resource management solutions such as JMX and legacy systems using SNMP. In consequence, there is no way to provide a unified management console view of a mixed SNMP legacy and resource management extension-enabled management agent without making significant modifications to the management agent.

Conventional interface solutions between legacy SNMP systems and management agents typically have been implemented as a standalone systems which are not integrated into the management agent. As such, the standalone solutions cannot take advantage of the full range of features provided by the management agent. For example, standalone solutions cannot take advantage of notifications.

Another disadvantage of conventional interface solutions is that significant recoding and/or rebuilding of portions of the management agent is required. That is, to implement a conventional interface, developers must re-build management software components of the management agent using tools provided by the solution package to ensure that the resulting management software components have the requisite knowledge of the SNMP management system. To provide another example, conventional solutions for interfacing a JMX management agent with an SNMP system require developers to generate the management software components or MBeans using a tool provided by the interface solution so that the resulting MBeans have knowledge of the SNMP system.

Such conventional solutions are implemented from the perspective of the SNMP system rather than from the perspective of the management agent. As a result, conventional solutions cannot be applied to existing resource management extension-enabled products, such as JMX-enabled products, without rebuilding and/or recoding the software management components of the management agent.

SUMMARY OF THE INVENTION

The invention disclosed herein provides a solution for interfacing a management agent with a Simple Network Management Protocol (SNMP) based management system. According to the present invention, existing management agent implementations which utilize resource management extension technology can be provided with SNMP support without having to implement code changes within the management agent. In particular, a protocol adapter can be added to the management agent. The protocol adapter does not require any knowledge of the SNMP protocol relied upon by the management system. Moreover, method disclosed herein can be performed automatically.

One aspect of the present invention can include a method of adding an SNMP interface to an existing resource management extension-enabled management agent without having to modify the management agent. For example, the management agent can be a Java-based management agent implemented using a resource management extension technology such as Java Management Extensions (JMX). Accordingly, an SNMP interface can be added to an existing JMX implementation of a management agent without modifying the management agent. The method can include reading a management information base definition of the management agent. A static mapping of the SNMP object identifiers to the management software components of the management agent can be created using the management information base definition.

During operation of the management agent, dynamic operating information for the management software components of the management agent can be determined. The dynamic operating information can be determined using reflection techniques which are available in various object oriented programming languages such as Java. For example, a number of instances of each SNMP object identifier can be determined and the method signatures can be determined for validation against the management information base definition. The static mapping can be updated with the dynamic operating information. Notably, the mapping can be continually or periodically updated with dynamic operating information as the management agent continues to operate. An index can be appended to each identified instance of an SNMP object identifier to uniquely reference the identified instance.

The method further can include receiving an SNMP object identifier request and converting the SNMP object identifier request to a request compliant with the management agent using the updated mapping. For example, an SNMP object identifier can be identified from the request and an associated management software component name and attribute can be determined for the SNMP object identifier from the updated mapping. Data for fulfilling the received SNMP object identifier request can be determined, for example via a management agent query to a managed resource. Accordingly, using the updated mapping, an SNMP response to the SNMP object identifier request can be built specifying the determined data. The SNMP response can be sent to an SNMP management system. For example, an SNMP trap can be sent responsive to receiving a resource management extension notification. The method can include receiving an SNMP request over a first User Datagram Protocol/Internet Protocol (UDP/IP) port and sending an SNMP response over a second UDP/IP port.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for interfacing a management agent with a Simple Network Management Protocol (SNMP) based management system. According to the present invention, existing management agent implementations which utilize resource management extension technology can be provided with SNMP support without having to implement code changes within the management agent. In particular, a protocol adapter can be added to the management agent which does not require any knowledge of the SNMP protocol relied upon by the management system.

Figure 1:
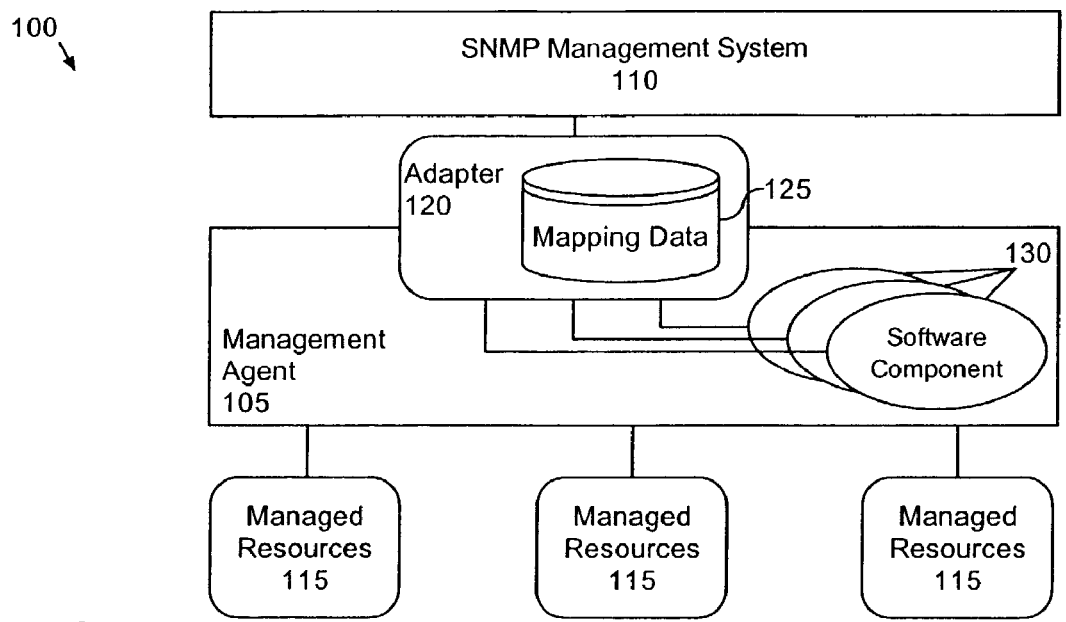
FIG. 1 is a schematic diagram illustrating a system for interfacing an existing management agent and a management system in accordance with the inventive arrangements disclosed herein.

FIG. 1 is a schematic diagram illustrating a system 100 for interfacing an existing management agent and a management system in accordance with the inventive arrangements disclosed herein. The system 100 includes a management agent 105 which is used to interface a management system 110 with various managed resources 115. The management system can be any of a variety of SNMP-enabled management systems (SNMP management system) including sophisticated enterprise level management systems or domain specific management systems. The management system can include a console through which personnel can monitor and interact with the managed resources 115. As noted, the managed resources can include, but are not limited to, business applications, devices, or software implementations of services or policies.

The management agent 105 can be any of a variety of resource management extension-enabled programming language architectures which serve to isolate the managed resources 115 of an information technology system from the SNMP management system 110. The management agent 105 can function as a management software component server including management software components 130. For example, according to one embodiment of the present invention, the management agent can be implemented using the Java Management Extension (JMX) architecture. Accordingly, the management agent can be a JMX management bean or MBean server.

The management agent 105 can include an adapter 120 for communicating with the SNMP management system 110. It should be appreciated that various resource management extension architectures, including JMX, define a mechanism for adding protocols adapters. Accordingly, the adapter 120 can be a plug-in protocol adapter serving as an interface between the management agent 105 and the SNMP management system 110. The adapter 120 can include mapping data 125. The mapping data 125 can be developed using a combination of a static mapping procedure which is updated using a dynamic procedure. In any case, the mapping data 125 can specify relationships among SNMP object identifiers (OIDs) and management software components of the management agent 105.

The present invention can generate mapping data 125 for the adapter 120 from a user generated management information base (MIB). The MIB must be created to manage resources via an SNMP management system. The user can create and validate, or compile, the MIB definition with any of a variety of commercially available tools using Abstract Syntax Notation number One (ASN.1). The MIB definition provides an SNMP representation of the management agent. The resulting MIB definition is used by the management system (or console of the management system) to interpret data from the management agent and traverse the hierarchical MIB definition tree. For example, the MIB definition can provide logical names for object identifiers of the SNMP management system.

The MIB definition can be created such that a node in the MIB definition tree is defined for each management software component to be managed. The logical name of the node can be the classname of the management software component with a descriptor appended to the name. Entries beneath the node in the tree belong to the defined management software component. For example, in a JMX implementation, a node labeled "PersonMBean" represents the JMX Person MBean, and all nodes below the PersonMBean object represent object instances of that object. Under each object instance are the methods and attributes. The attribute and method names defined in the MIB definition also must match those attributes and methods exposed in the management software component. Thus, if the name attribute of a person is referred to as "Name" in the MIB definition, the name attribute also should be referenced as "Name" in the management software component.

Attribute "Get" and "Set" capabilities can be made to match between the protocols. For example, within a JMX implementation, if there is a getter and not a setter in the JMX MBean for a specific attribute, the SNMP MIB definition can indicate this with a read-only attribute. The name given to trap nodes in the MIB definition can be made to match the JMX Event "type". Accordingly, a mapping for every field in the notification can be represented as an SNMP trap parameter in the user defined MIB for the management agent system.

Figure 2:
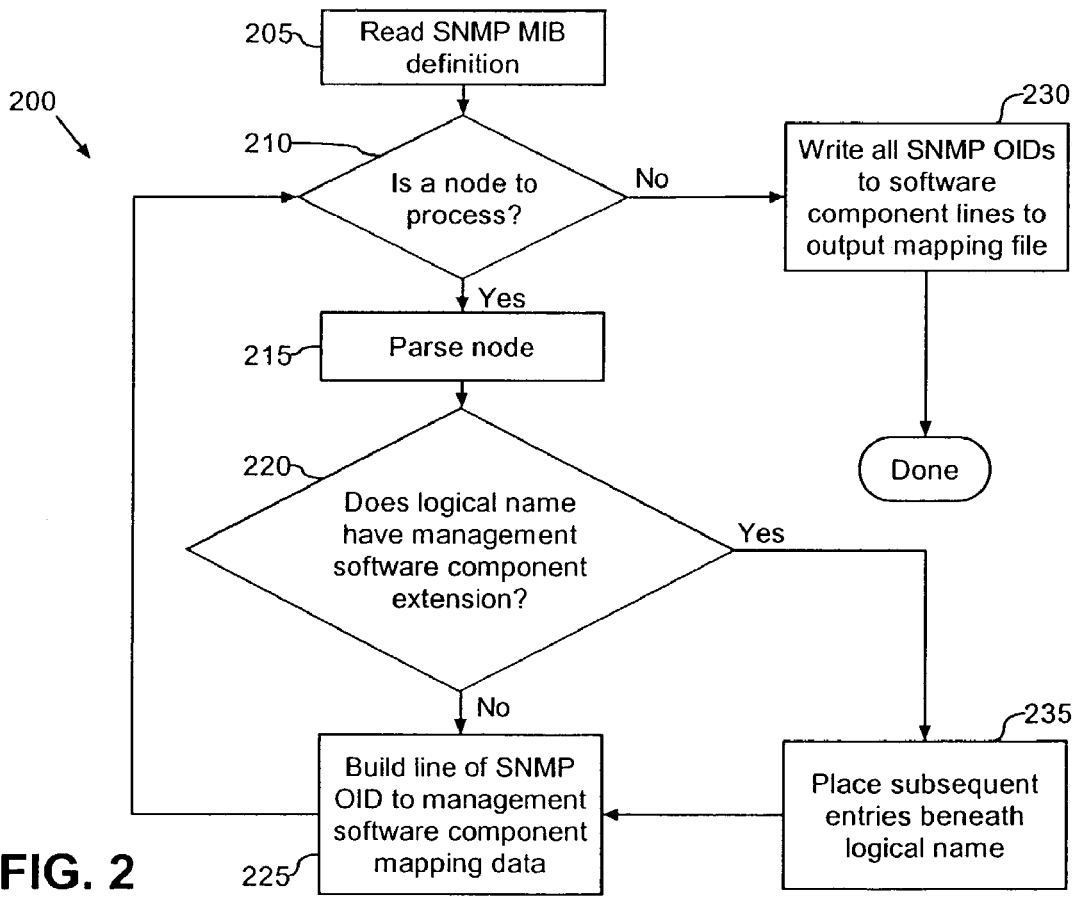
FIG. 2 is a flow chart illustrating a method of generating a static mapping of Simple Network Management Protocol object identifiers to management software components of a management agent.

FIG. 2 is a flow chart illustrating a method 200 of generating a static mapping of SNMP object identifiers to management software components of a management agent. The method 200 can be followed whether the SNMP adapter automatically generates the static mapping data or whether a mapping tool is used by a user. That is, the static mapping can be performed either by the SNMP protocol adapter or a mapping tool. For example, if a mapping tool is used, the mapping tool can read the MIB definition of the management agent and create the static object identifier to management software component mapping. Using a mapping tool can be advantageous in cases where exceptions to the MIB definition exist which may be included in the mapping. Alternatively, as mentioned, when the SNMP protocol adapter loads, the protocol adapter can read the MIB definition to create the static mapping of SNMP object identifiers to management software components.

In step 205, the MIB definition can be read. In step 210, a determination can be made as to whether another node is to be processed. If so, the method can continue to step 215. If not, the method continues to step 230 where the object identifier to management software component mapping data can be written to a configuration file. Continuing with step 215, the current node can be parsed. For example, from the node, the object identifier, the logical name of the management software component, as well as the parent information can be determined. In step 220, a determination can be made as to whether the logical name has an extension. For example, referring to a JMX-enabled management agent, a determination can be made as to whether the logical name has an MBean extension. If so, the management software component name can be used for entries located beneath the current node. If no extension is associated with the identified logical name, a line of the mapping table can be constructed in step 225. The method can repeat as necessary to process further nodes.

Figure 3:
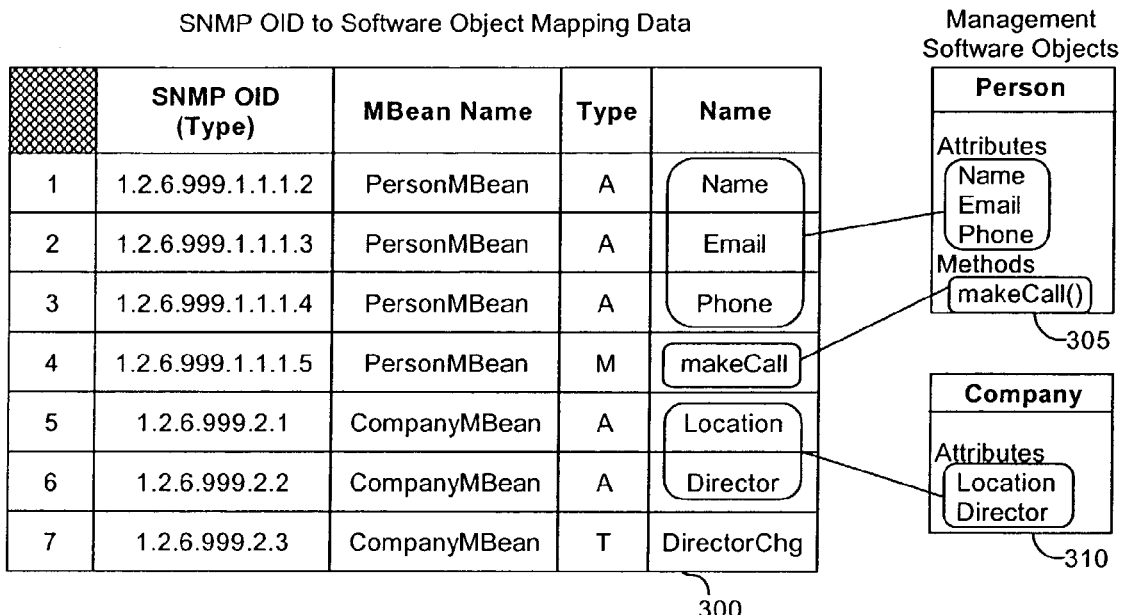
FIG. 3 is a table illustrating a mapping of Simple Network Management Protocol object identifiers to management software components of a management agent for use with the system of FIG. 1.

FIG. 3 is a table 300 illustrating a mapping of SNMP object identifiers to management software components of a management agent for use with the system of FIG. 1. As shown, the static mapping data represented in table 300 reflects the relationship between SNMP object identifiers and management software components. The "Type" column indicates whether the entry in the table 300 corresponds to an attribute, a method, or a trap/event. The various attributes and methods listed correspond to the attributes and methods of the management software components of the management agent. Thus, the mapping data indicates the association between particular SNMP object identifiers with the "name", "email", and "phone" attributes and method "makeCall" of the person management software component 305. Similarly, the mapping data indicates associations of proper SNMP object identifiers with the "location" and "director" attributes of the company management software component 310.

As indicated by table entry 7, an SNMP trap can be sent upon a director attribute change event. Management extension events, (i.e. JMX events) can be sent to the console as SNMP traps. For example, when a management extension event is received, the event can be converted into an SNMP trap and then sent out to the console.

Figure 4:
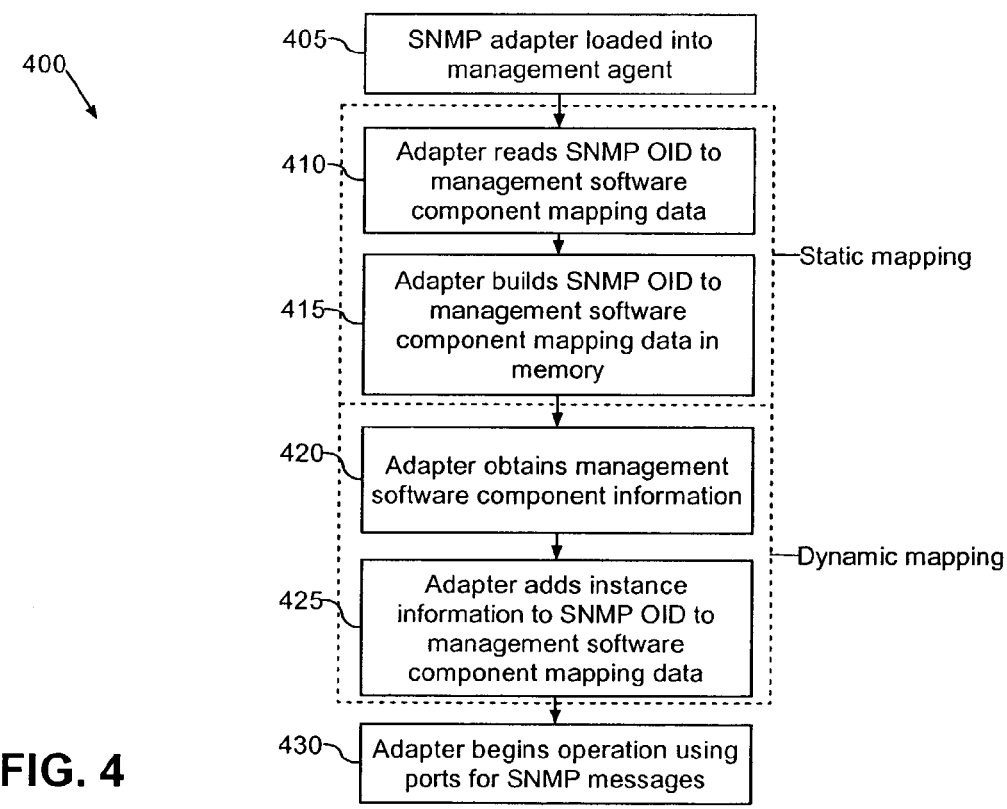
FIG. 4 is a flow chart illustrating a method of updating the static mapping of Simple Network Management Protocol object identifiers to management software components with dynamically determined operating information.

FIG. 4 is a flow chart illustrating a method 400 of updating the static mapping of SNMP object identifiers to software objects with operational information dynamically determined from the software management objects of the management agent. In step 405, the SNMP adapter can be loaded into the software management agent. For example, the SNMP adapter can be loaded into an MBean Server. The static mapping can be initiated in step 410 where the adapter can read the SNMP object identifier to management software component configuration file. In step 415 the adapter can build the SNMP object identifier to management software component mapping data or configuration file, whether a table, a registry, or other data structure, in memory.

The dynamic mapping can begin in step 420 where the SNMP adapter can obtain operational information regarding the management software components of the management agent. For example, the SNMP adapter can utilize reflection techniques to determine the number of instances of object identifiers which can be indicated as entries in the mapping configuration file, the method signatures for validation against the MIB definition, as well as which notifications are supported. In step 425 the SNMP adapter can add the dynamically determined operational information to the mapping configuration file. Accordingly, a combination of static definition and dynamic discovery can be used to build an in memory registry of SNMP object identifiers to management software components for any resource management extension-enabled agent. In step 430, the SNMP adapter can begin operation using ports for SNMP messages. For example, the SNMP adapter can listen to SNMP requests on one User Datagram Protocol/Internet Protocol (UDP/IP) port and send responses and traps/events on another UDP/IP port.

Figure 5:
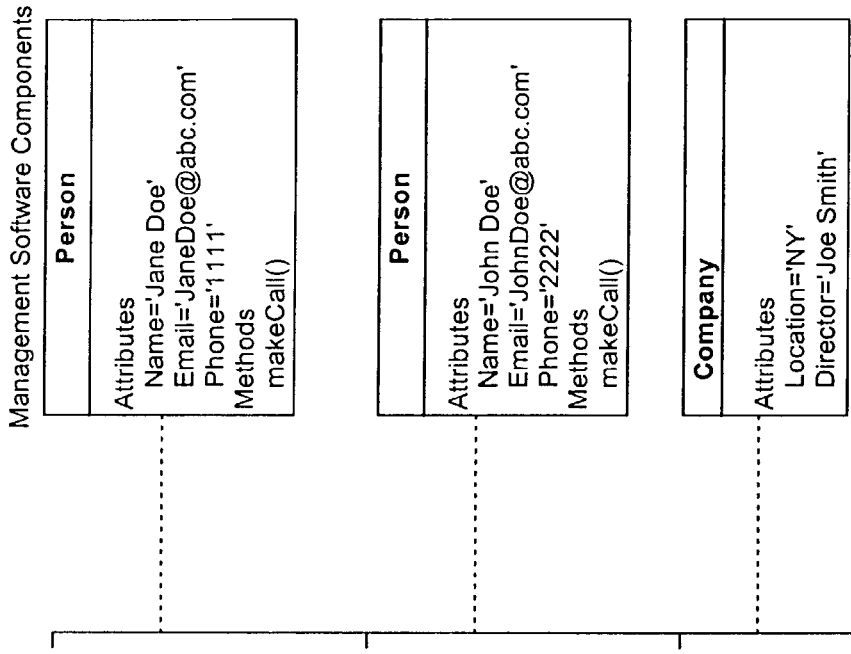
FIG. 5 is a table illustrating a mapping of Simple Network Management Protocol object identifiers to management software components of a management agent for use with the system of FIG. 1 after the inclusion of dynamically determined data.

FIG. 5 is a table 500 illustrating a mapping of SNMP object identifiers to management software components of a management agent for use with the system of FIG. 1 after the inclusion of dynamically determined data. The table 500 illustrates the runtime SNMP object identifier to management software component mapping data that can be stored in memory of the SNMP adapter. As shown in the table 500, the "Person:Name" management software component has two instances, an instance for "Jane Doe" and an instance for "John Doe". When building the dynamic mapping data, the SNMP adapter can assign object identifier instance indexes to the management software component instances. The index can begin with one (1) and increment for each instance. If a single instance is detected, a zero (0) can be appended. Still, those skilled in the art will recognize that any of a variety of indexing techniques can be used such that each instance of a management software component can be uniquely referenced.

For example, as shown in FIG. 5, the SNMP object identifier for the "Name" attribute of the "Person" management software component is 1.2.6.999.1.1.1.2. The table entry for the "Name" attribute of the "Jane Doe" object instance of the "Person" management software component is indicated by adding a number one (1) to the SNMP object identifier, yielding an SNMP object identifier of 1.2.6.999.1.1.1.2.1. As shown, each attribute and/or method associated with the "Jane Doe" management software component as been assigned an index of one (1). The next instance of the "Person" management software component corresponding to "John Doe" has been assigned an index of two (2). The SNMP console can disregard which instance is assigned to a particular index number. Notably, as one instance of the "Company" management software component is listed in the table 500, an index of zero (0) has been added to the SNMP object identifier index.

Figure 6:
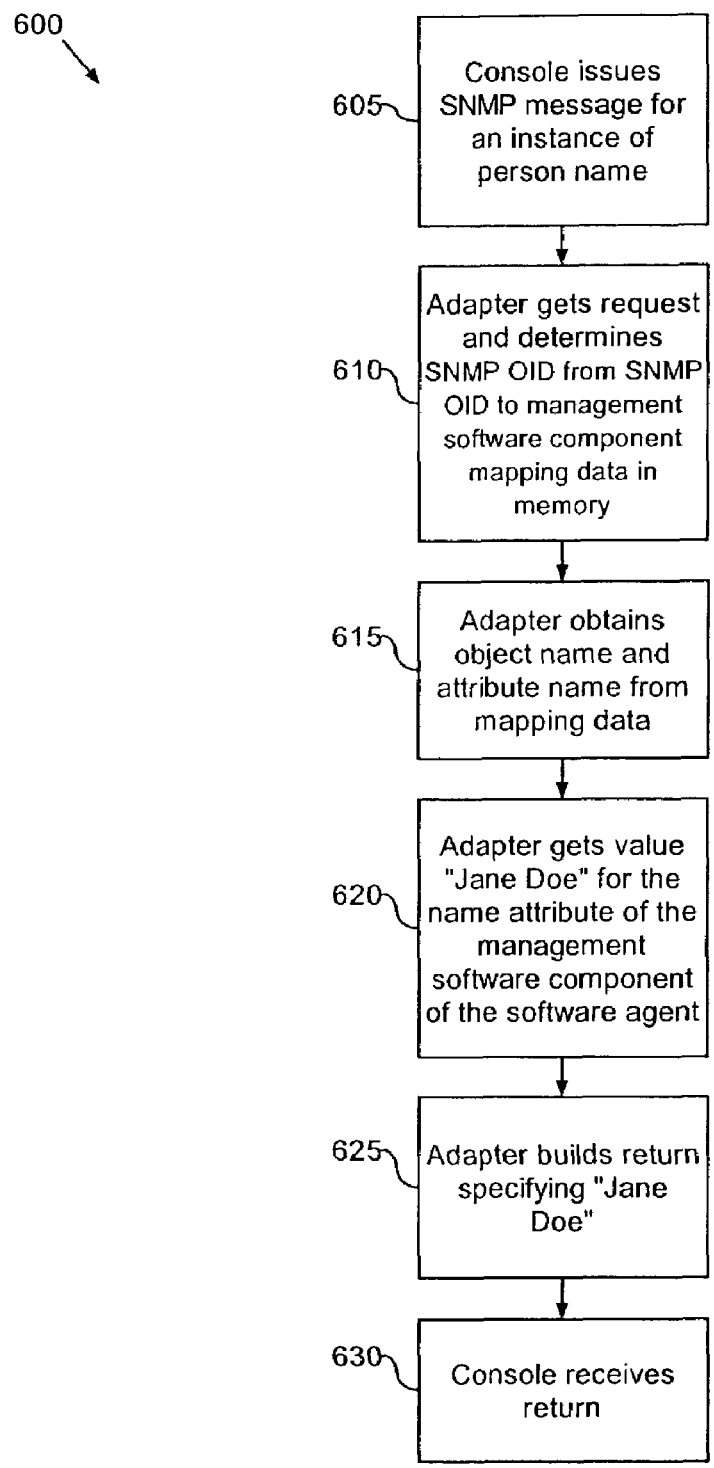
FIG. 6 is a flow chart illustrating a method of operation of a Simple Network Management Protocol adapter in accordance with the inventive arrangements disclosed herein.

FIG. 6 is a flow chart illustrating a method 600 of operation of the SNMP adapter in accordance with the inventive arrangements disclosed herein. Accordingly, the method can begin in a state wherein the static mapping of SNMP object identifiers to management software components has been determined and the dynamically determined operational information also has been incorporated into the mapping data. The resulting mapping data, as previously noted, can be stored in memory of the SNMP adapter. The method can begin in step 605 where an SNMP management system console can issue an SNMP message. The SNMP message can include a Protocol Data Unit (PDU) which can specify an action to be performed. For example, the PDU can specify the action "GetRequest" for an instance of the "Person:Name" management software component corresponding to the object identifier of 1.2.6.999.1.1.1.2.1. In step 610, the SNMP adapter receives the request and identifies the object identifier from the mapping data stored in memory.

Accordingly, in step 615, the SNMP adapter can determine the object name and attribute name from the mapping data. In step 620, the SNMP adapter obtains the value "Jane Doe" for the name attribute of the management software component of the management agent. For example, within a JMX-enabled management agent, the SNMP adapter can get the value "Jane Doe" for the indicated MBean name attribute from the MBean Server. In particular, the SNMP "GetRequest" can be translated into a "getName( )" attribute query. In step 625 the SNMP adapter can build a return "GetResponse" PDU specifying the name "Jane Doe". In step 630, the SNMP management system console can receive the return "GetResponse" from the SNMP adapter. SNMP traps can be sent by the adapter when resource management extension notifications are received.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of adding a simple network management protocol (SNMP) interface to an existing resource management extension-enabled management agent without modifying said management agent, said method comprising:
   reading a management information base definition of said management agent;
   creating a static mapping of SNMP object identifiers to management software components of said management agent using said management information base definition;
   during operation of said management agent, determining dynamic operating information for said management software components of said management agent; and
   updating said static mapping with said dynamic operating information.

2. The method of claim 1, wherein said method is performed automatically.

3. The method of claim 1, wherein said management agent is implemented in Java.

4. The method of claim 1, wherein said resource management extension is Java Management Extension.

5. The method of claim 1, further comprising:
   periodically updating said mapping with dynamic operating information as said management agent continues to operate.

6. The method of claim 1, said step of determining dynamic operating information comprising:
   determining dynamic operating information for said management software components of said management agent using reflection.

7. The method of claim 6, further comprising:
   determining a number of instances of each SNMP object identifier; and
   determining method signatures for validation against said management information base definition.

8. The method of claim 7, further comprising:
   appending an index to each identified instance of an SNMP object identifier to uniquely reference said identified instance.

9. The method of claim 8, further comprising:
   receiving an SNMP object identifier request; and
   converting said SNMP object identifier request to a request compliant with said management agent using said updated mapping.

10. The method of claim 9, said converting step further comprising:
    identifying an SNMP object identifier from said request; and
    determining an associated management software component name and attribute for said SNMP object identifier from said updated mapping.

11. The method of claim 10, further comprising:
    determining data to fulfill said received SNMP object identifier request;
    using said updated mapping, building an SNMP response to said SNMP object identifier request specifying said determined data; and
    sending said SNMP response to an SNMP management system.

12. The method of claim 8, further comprising:
    sending an SNMP trap responsive to receiving a resource management extension notification.

13. A machine-readable storage, having stored thereon a computer program having a plurality of code sections executable by a machine for causing the machine to perform the steps of:
    reading a management information base definition of an existing resource management extension-enabled management agent;
    creating a static mapping of simple network management protocol (SNMP) object identifiers to management software components of said management agent using said management information base definition;

during operation of said management agent, determining dynamic operating information for said management software components of said management agent; and updating said static mapping with said dynamic operating information.

14. The machine-readable storage of claim 13, wherein said method is performed automatically.

15. The machine-readable storage of claim 13, wherein said management agent is implemented in Java.

16. The machine-readable storage of claim 13, wherein said resource management extension is Java Management Extension.

17. The machine-readable storage of claim 13, further comprising:

periodically updating said mapping with dynamic operating information as said management agent continues to operate.

18. The machine-readable storage of claim 13, said step of determining dynamic operating information comprising:

determining dynamic operating information for said management software components of said management agent using reflection.

19. The machine-readable storage of claim 18, further comprising:

determining a number of instances of each SNMP object identifier; and determining method signatures for validation against said management information base definition.

20. The machine-readable storage of claim 19, further comprising:

appending an index to each identified instance of an SNMP object identifier to uniquely reference said identified instance.

21. The machine-readable storage of claim 20, further comprising:

receiving an SNMP object identifier request; and converting said SNMP object identifier request to a request compliant with said management agent using said updated mapping.

22. The machine-readable storage of claim 21, said converting step further comprising:

identifying an SNMP object identifier from said request; and determining an associated management software component name and attribute for said SNMP object identifier from said updated mapping.

23. The machine-readable storage of claim 22, further comprising:

determining data to fulfill said received SNMP object identifier request;

using said updated mapping, building an SNMP response to said SNMP object identifier request specifying said determined data; and sending said SNMP response to an SNMP management system.

24. The machine-readable storage of claim 20, said step of sending said SNMP response comprising:

sending an SNMP trap responsive to receiving a resource management extension notification.

* * * * *